US012332871B2

(12) United States Patent
Muthukrishnan et al.

(10) Patent No.: US 12,332,871 B2
(45) Date of Patent: Jun. 17, 2025

(54) REPRESENTATION AND MANAGEMENT OF INFRASTRUCTURE STATE OF A DISTRIBUTED DATABASE CLOUD SERVICE

(71) Applicant: Oracle International Corporation, Redwood Shores, CA (US)

(72) Inventors: Nagarajan Muthukrishnan, San Ramon, CA (US); Prasanna Venkatesh Ramamurthi, Bangalore (IN); Ranjit Murali, San Jose, CA (US); Srikanth Nagandla, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 18/220,451

(22) Filed: Jul. 11, 2023

(65) Prior Publication Data

US 2025/0021542 A1    Jan. 16, 2025

(51) Int. Cl.
*G06F 16/23* (2019.01)
*G06F 16/27* (2019.01)

(52) U.S. Cl.
CPC .......... *G06F 16/2343* (2019.01); *G06F 16/27* (2019.01)

(58) Field of Classification Search
CPC .................................................. G06F 16/2343
USPC ........................................................ 707/613
See application file for complete search history.

(56) References Cited

U.S. PATENT DOCUMENTS

| 11,290,330 | B1 * | 3/2022 | Kothuri ................. H04L 41/082 |
| 2016/0092173 | A1 * | 3/2016 | Rodrigues ............... H04L 67/00 |
| | | | 717/106 |
| 2022/0188082 | A1 * | 6/2022 | Mouleeswaran ... G06F 16/9027 |
| 2024/0241759 | A1 * | 7/2024 | Gamage ................ G06F 9/4881 |

FOREIGN PATENT DOCUMENTS

CN           110521188 A   *  11/2019   ......... G06F 16/2379

* cited by examiner

*Primary Examiner* — Syling Yen
(74) *Attorney, Agent, or Firm* — Hickman Becker Bingham Ledesma LLP

(57) ABSTRACT

Techniques are provided for maintaining snapshots of state information for a plurality of resource entities, within a distributed cloud service. A first snapshot of state information for the plurality of resource entities is maintained at an endpoint in persistent storage. A request to modify resources allocated to resource entities is received. A virtual lock on the state information reflected in the first snapshot is obtained. Upon obtaining the virtual lock, a service determines, based on the first snapshot, that there are available resources to perform the request to modify resources. A second snapshot of the state information, reflecting the modification of resources allocated to resource entities, is then generated and stored at the endpoint in persistent storage. The virtual lock on the state information is released and the resources allocated to the resource entities are modified according to the request.

20 Claims, 9 Drawing Sheets

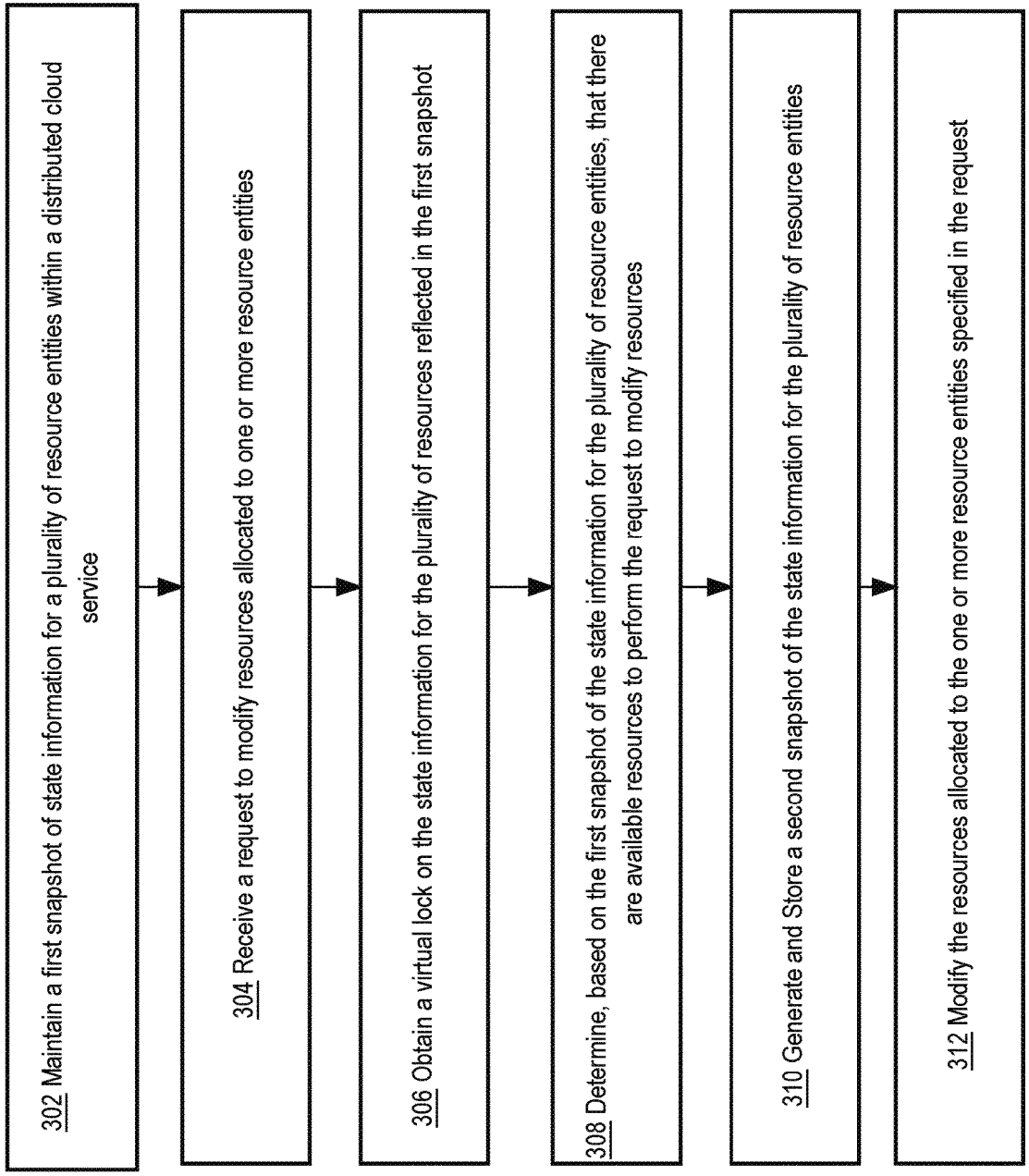

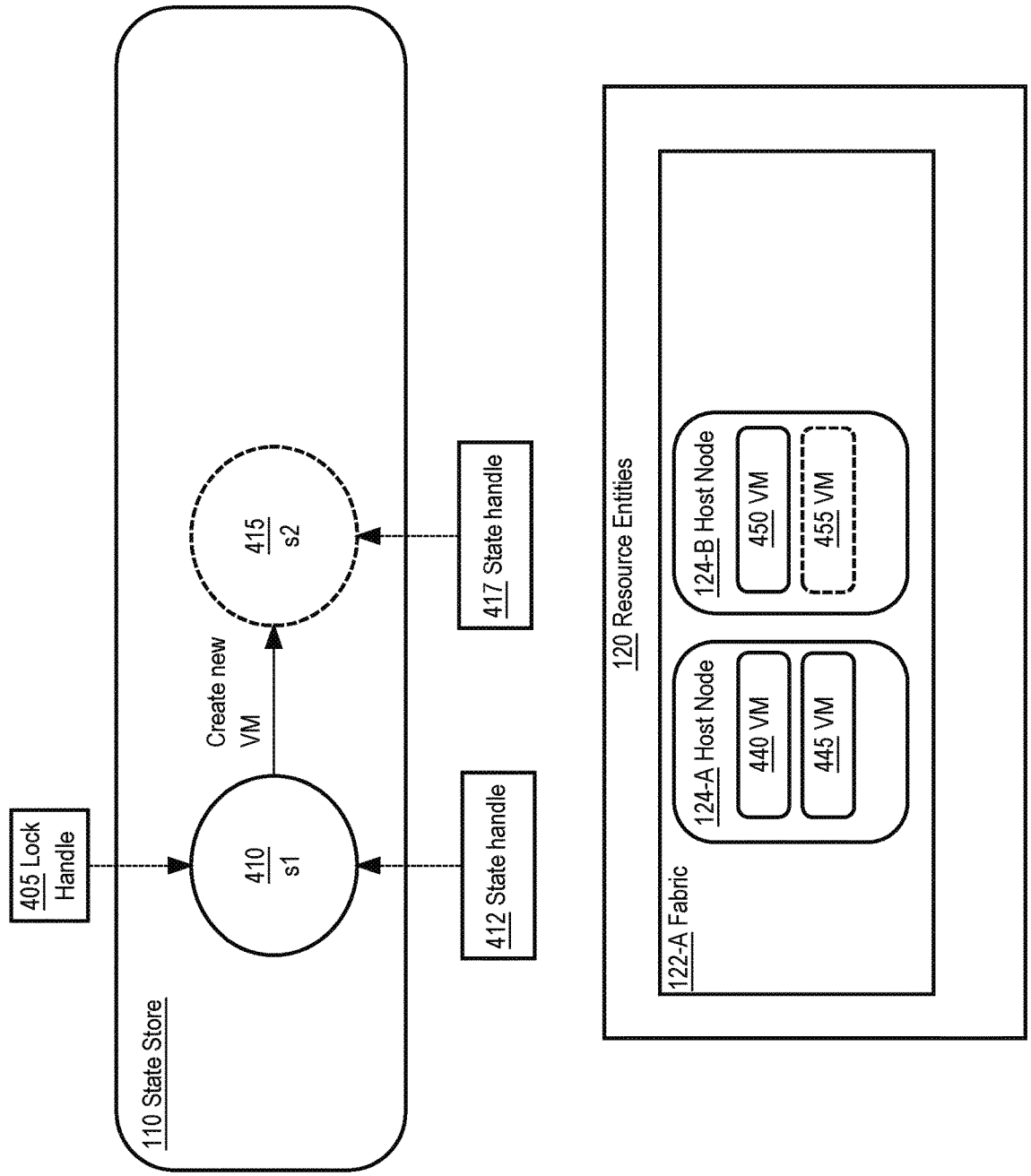

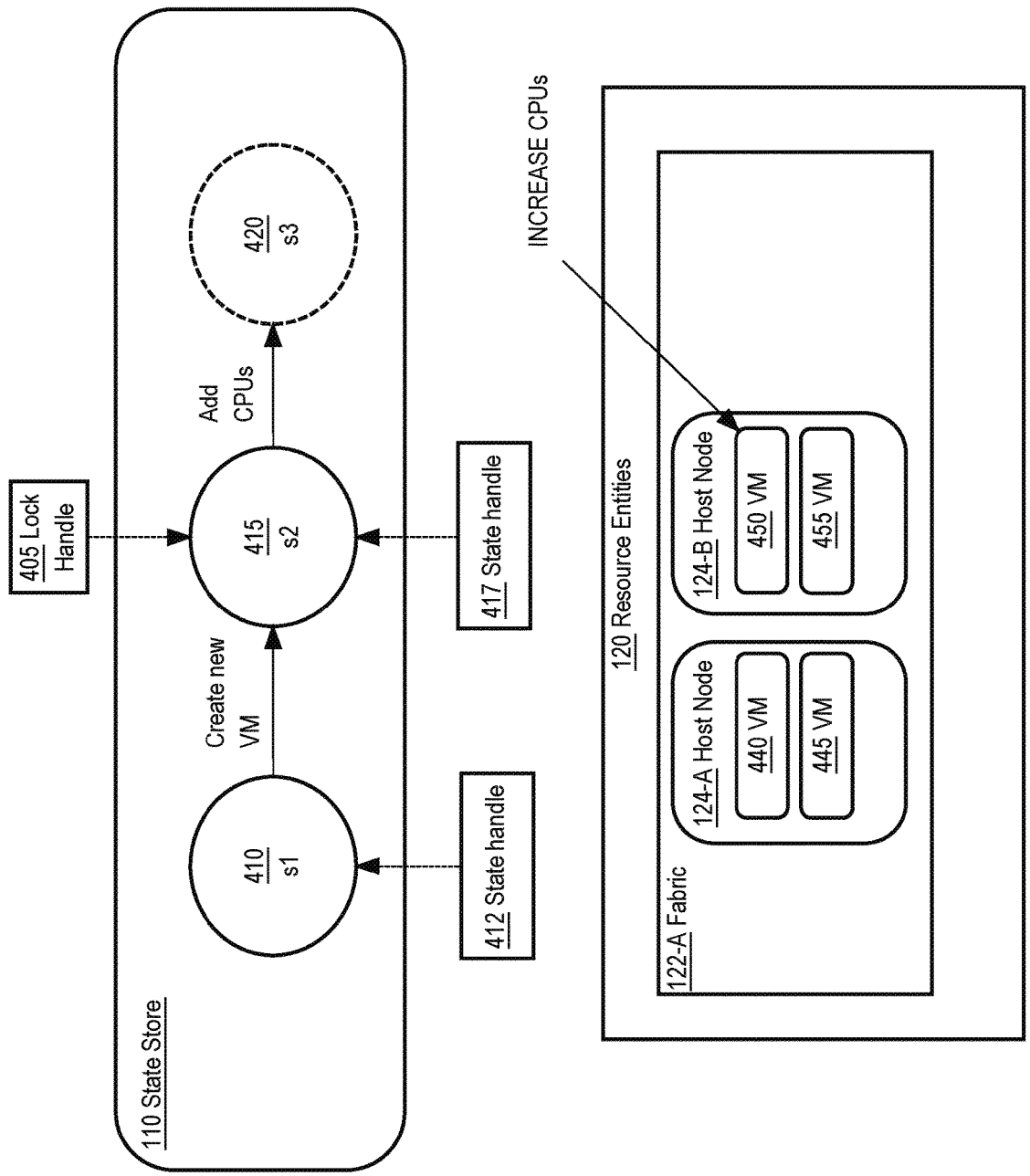

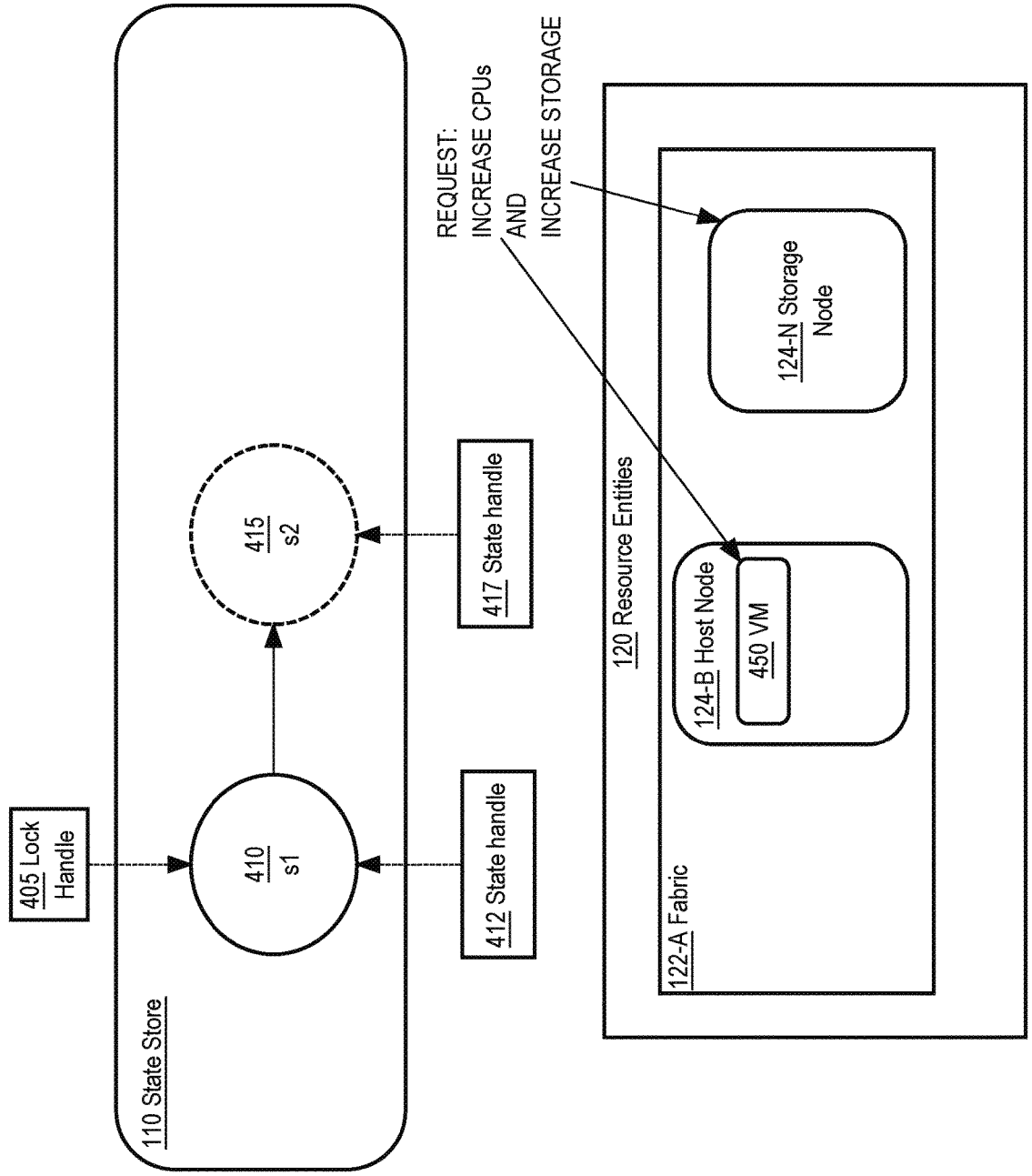

REPRESENTATION AND MANAGEMENT OF INFRASTRUCTURE STATE OF A DISTRIBUTED DATABASE CLOUD SERVICE

FIELD OF THE INVENTION

The present invention relates to managing and synchronizing resource state information for resources in a distributed cloud environment. More specifically, tracking multiple resource change requests to modify resources within the distributed cloud environment.

BACKGROUND

Heterogenous cloud environments are made up of various internal and customer assigned resources. Due to the nature of cloud environments, demand for cloud resources may vary at any given time. As a result, most cloud environments offer services to manage and operate a varied pool of resources. Resource management of cloud services typically involves resource allocation and de-allocation, adjusting infrastructure to meet the needs of clients, ingesting new infrastructure, removing older or faulty infrastructure, and optimizing the usage of infrastructure. In large cloud environments the infrastructure may include several thousand components including fabrics, compute racks, host nodes, compute nodes, storage nodes, virtual machines, database clusters, and so on.

To ensure performance, scalability, and consistency of cloud environments, there needs to be a clear representation of available resources when fulfilling resource change requests. One such solution, is to manage resources at the entity level, e.g. each server manages its own resources. However, when each entity manages their own resources, processing change requests would require services processing the change requests to individually query each entity to determine what resources are currently available on each entity. This solution, however, would result in increased processing time and increased network bandwidth. Additionally, this solution may lead to either inconsistent or deadlock scenarios because each individual entity is in charge of tracking their own synchronization. Thus, the processing effort needed to ensure consistent synchronization between each individual entity may become costly.

Another solution is to manage resource state information in a central location. However, managing resource state information in a central location may lead to service bottlenecks as the state information stored in a central location would have to be constantly updated when new change requests are processed and completed. Additionally, maintaining consistent resource data may be a challenge without a locking mechanism to ensure that multiple entities are not assigned the same resources.

Locking mechanisms may be used to prevent multiple processes from competing for resources. However, locking mechanisms may be prone to causing significant backlogs. For instance, servicing a request to provision a new virtual machine may cause a set of resources to be locked for a significant amount of time, such as minutes, in order to complete the request. However, in large scale cloud environments where several thousand change requests may be processed in a short amount of time, extended locks may cause significant degradation in performance. Therefore a mechanism for maintaining a programmatic representation of cloud infrastructure is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts a process for receiving a request to modify resources and modifying resource allocations within a distributed cloud service, according to an embodiment.

FIGS. 4A-4D depict example embodiments of a state store storing snapshots of state information for a plurality of resource entities within a distributed cloud service, according to an embodiment.

DETAILED DESCRIPTION

Figure 1:
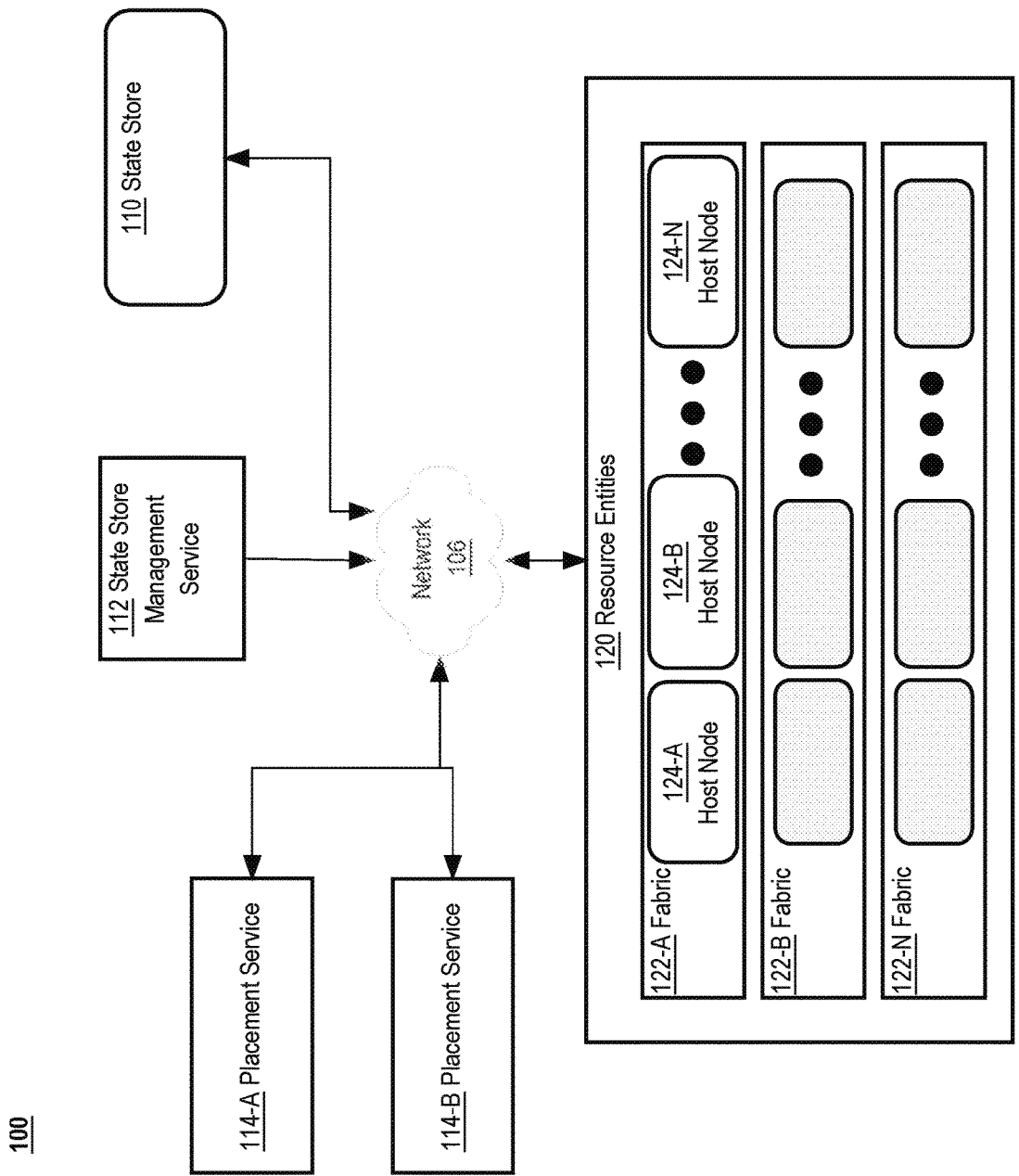
FIG. 1 is a system diagram that illustrates a distributed cloud service in which allocations of entity resources are tracked at a centralized endpoint, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for maintaining snapshots of state information for a plurality of resource entities, within a distributed cloud service, using an object store. A snapshot of state information for the plurality of resource entities includes resource entity attribute information for resources within the distributed cloud service at a given point in time. For example, a first snapshot may include types and amounts of resources allocated to resource entities at time T1. The first snapshot may be used by an entity to determine whether a change request may be fulfilled. For instance, the entity may be requesting additional CPU resources for provisioning a new virtual machine. If there are enough CPU resources to fulfill the change request, then a new, second snapshot may be created that reflects fulfillment of the change request. The second snapshot would then represent updated types and amounts of resources allocated to the resource entities at time T2, where time T2 represents a time after the change request has been fulfilled.

The object store is used to store the snapshots of state information for the plurality of resource entities. Specifically, the snapshots of state information for the plurality of resource entities are stored within a well-formed directed acyclic graph represented as a serializable object. That is, any changes to the infrastructure of the plurality of resources will cause a new snapshot of the state information to be created which is represented by a new node within the directed acyclic graph.

In an embodiment, a state store management service maintains a first snapshot of state information for a plurality of resource entities within a distributed cloud service. The state store management service receives a request to modify resources allocated to one or more resource entities. The request may be received from a placement service configured to generate resource change requests for the state store management service. Upon receiving the request, the state store management service provides a virtual lock of the first snapshot to the placement service. The virtual lock prevents other services from making changes to the state information reflected in the first snapshot. Upon obtaining the virtual lock, the placement service determines, based on the first snapshot, that there are available resources to perform the request to modify resources allocated to the one or more resource entities. For example, if the request to modify resources is a request to increase the number of central processing units (CPUs) allocated to a virtual machine from 10 CPUs to 20 CPUs, then upon obtaining the virtual lock, the placement service uses the first snapshot to determine that 10 more CPUs are available to be allocated to the virtual machine.

Upon determining that resources are available to fulfill the request to modify resources, the placement service generates a second snapshot of state information for the plurality of resource entities, where the second snapshot reflects the modification of resources allocated to the one or more resource entities specified in the request. The second snapshot is stored within the object store. The virtual lock on the state information for the plurality of resource entities is released and the plurality of resource entities are modified to reflect the changes specified in the request to modify resources.

The second snapshot stored in the object store may reflect the future state of the plurality of resource entities prior to the resource entities being modified. By reflecting the future intended state of the plurality of resource entities, the state store management service may be able to process multiple change requests prior to the change requests being reflected in the plurality of resource entities. For example, performing a change request to create a new virtual machine on a server may include provisioning one or more CPUs, memory, and physical storage. Provisioning such resources may take minutes to complete. However, determining whether the change request may be fulfilled based on state information for the plurality of resource entities may be completed in much less time, such as milliseconds. Therefore by creating a new snapshot that reflects a future intended state for the plurality of resources, the system may be able to process more change requests without having to wait for the physical changes to resource entities to be completed. Thereby reducing any potential bottlenecks caused by waiting for resources to complete outstanding change operations.

Structural Overview

FIG. 1 is a system diagram that illustrates a distributed cloud service in which allocations of entity resources are tracked at a centralized endpoint, according to an embodiment. System 100 is implemented with functionality for managing resource change requests and managing state information for a plurality of resource entities within system 100. In an embodiment, system 100 comprises a state store 110, a state store management service 112, placement services 114-A and 114-B, and cloud resources 120.

The state store 110 represents cloud based persistent storage that is accessible over network 106 and implemented to store snapshots of state information for resource entities within system 100. Cloud resources 120 represent assignable resource entities in system 100. In an embodiment, state store 110 may be an object store. An object store is a computer data storage architecture that manages data as objects. Objects in an object store may not be modified in place. A new version of an object may only be created by writing a new version of the object to the object store. An object store utilizes a flat address space, called a storage pool. Within the state store 110, an endpoint may be designated for storing the snapshots of state information for cloud resources 120. The snapshots stored at the endpoint may be accessible by various services using an application programming interface (API) provided by the state store management service 112. Details describing APIs for accessing snapshots of state information are described in the STATE STORE MANAGEMENT SERVICE INTERFACES section herein. In another embodiment, the state store 110 may be implemented as a relational database configured to store snapshots of state information of cloud resources 120 within one or more relational database tables. In yet other embodiments, the state store 110 may be represented using any other available storage technology.

In an embodiment, the snapshots of state information of cloud resources 120 are stored within the state store 110 in a directed acyclic graph (DAG), where each node in the DAG represents a particular snapshot of state information of the cloud resources 120 at a given point in time. A given point in time may represent a point of time in the past, a point of time representing the present, and a future point in time. A snapshot of state information representing a future point in time may represent the future state of cloud resources 120 after a change request has been completed. For instance, a leaf node in the DAG may represent the current state of resource allocations for system 100. If a request to modify resource allocations is received and approved, then a new node may be generated. The new node may become a child node of the previous leaf node. The new node may represent the future target state of resource allocations of cloud resources 120 once the request to modify resources has been completed. Thus, the new node becomes the leaf node in the DAG and will represent the current state of resource allocations once the approved request to modify resource allocations is complete.

In an embodiment, placement services 114-A and 114-B each represent services implemented to generate change requests to modify resource allocations of the cloud resources 120. Examples of change requests include, but are not limited to, requests to add one or more VMs to system 100 using entity resources from the cloud resources 120, requests to modify memory, CPUs, and storage currently allocated to existing entities in system 100, and requests to remove entities such as deleting an existing VMs and deallocating the corresponding VM resources.

In an embodiment, the state store management service 112 is implemented to receive change requests from the placement services 114-A and 114-B and provide copies of snapshots of state information of cloud resources 120 to the placement services 114-A and 114-B. Specifically, the state store management service 112 may provide a virtual lock on the latest snapshot of state information to the placement service 114A so that the placement service 114A may determine whether the change request can be fulfilled based on the latest snapshot. The virtual lock prevents any other change requests from altering the current allocations of entity resources, reflected in the latest snapshot, while the lock holder allocates resources to fulfill their change request. For example, if placement service 114A requests to add additional CPUs to a particular VM, then the state store management service 112 may provide the placement service 114A with a virtual lock on the leaf node in the DAG, where the leaf node represents the latest snapshot of state information for cloud resources 120. While the placement service 114A has the virtual lock, subsequent change requests, such as a change request from placement service 114B, will be denied because the leaf node in the DAG has a virtual lock preventing any changes to be made. Once the placement service 114 has determined how to allocate additional CPUs to the particular VM, the placement service 114 would return the virtual lock along with a new snapshot of the state information, where the new snapshot accounts for the future allocation of additional CPUs to the particular VM. Once the virtual lock has been returned to the state store management service 112, the state store management service 112 may provide the virtual lock to placement service 114B to service their subsequent change request. The described virtual lock on one or more nodes in the DAG may be herein referred to as a "subtree lock" on the DAG.

Cloud resources 120 may comprise a plurality of computing devices including, but not limited to, host nodes, compute nodes, and storage nodes arranged as fabrics 122-A, 122-B, and 122-N. Though not depicted in FIG. 1, computing devices of the fabrics may further be arranged in racks. System 100 may include any number of fabrics.

Referring to FIG. 1, Fabric 122-A is depicted as containing nodes 124-A, 124-B, and 124-N. Fabric 122-A may contain more or less nodes than as depicted in FIG. 1. Fabrics 122-B and 122-N also contain a plurality of nodes. Nodes 124-A, 124-B, and 124-N represent computing devices configured to run software. Nodes 124-A, 124-B, and 124-N may be heterogeneous, such that some nodes may be equipped with newer or additional central CPUs or graphic processing units (GPUs), or may be configured with more memory or storage, or with newer/different kinds of memory or storage. In an embodiment, each of the nodes 124-A, 124-B, and 124-N may represent different types of computing devices such as host nodes, compute nodes, storage nodes, or any other type of computer node.

Nodes 124-A, 124-B, and 124-N that are configured as host nodes may host VMs. A VM is a containment mechanism that is configured to perform computing tasks on a host node, which may or may not require accessing data stored remotely from the host compute node (e.g., on a storage node). A VM is run by hypervisor software on the host node. Because a virtual machine includes its own operating system, the computing tasks performed by the virtual machine do not require intervention of the host operating system. Any number of virtual machines may be run by a given host node, where virtual machines running on the same host node run in isolation from each other. Because of the isolation and flexibility afforded by virtual machines, cloud computing infrastructures generally employ virtual machines to implement customer applications.

Virtual machine clustering uses multiple virtual machines, e.g., running on different compute nodes, to jointly perform the computing tasks. The VMs of a given VM cluster communicate, e.g., using a private connection established via the network links between host nodes hosting the VMs of the cluster, to ensure coordination of application execution. For example, a VM cluster running within a given fabric implements a multi-node database system where each VM of the cluster runs one or more database server instances, all of which access and manage database data that is stored on a storage node in the same fabric.

State Store

In an embodiment, the state store 110 is an object store configured to store a DAG where the nodes of the graph represent snapshots of state information for cloud resources 120. Changes to resource allocations of cloud resources 120 occur via one or more change operations. For example, creating a new VM may cause a new allocation of CPUs, memory, and storage for running the new VM. These new allocations of cloud resources 120 cause a new state to be created, which causes a new leaf node to be added to the graph stored in the state store 110.

Figure 2:
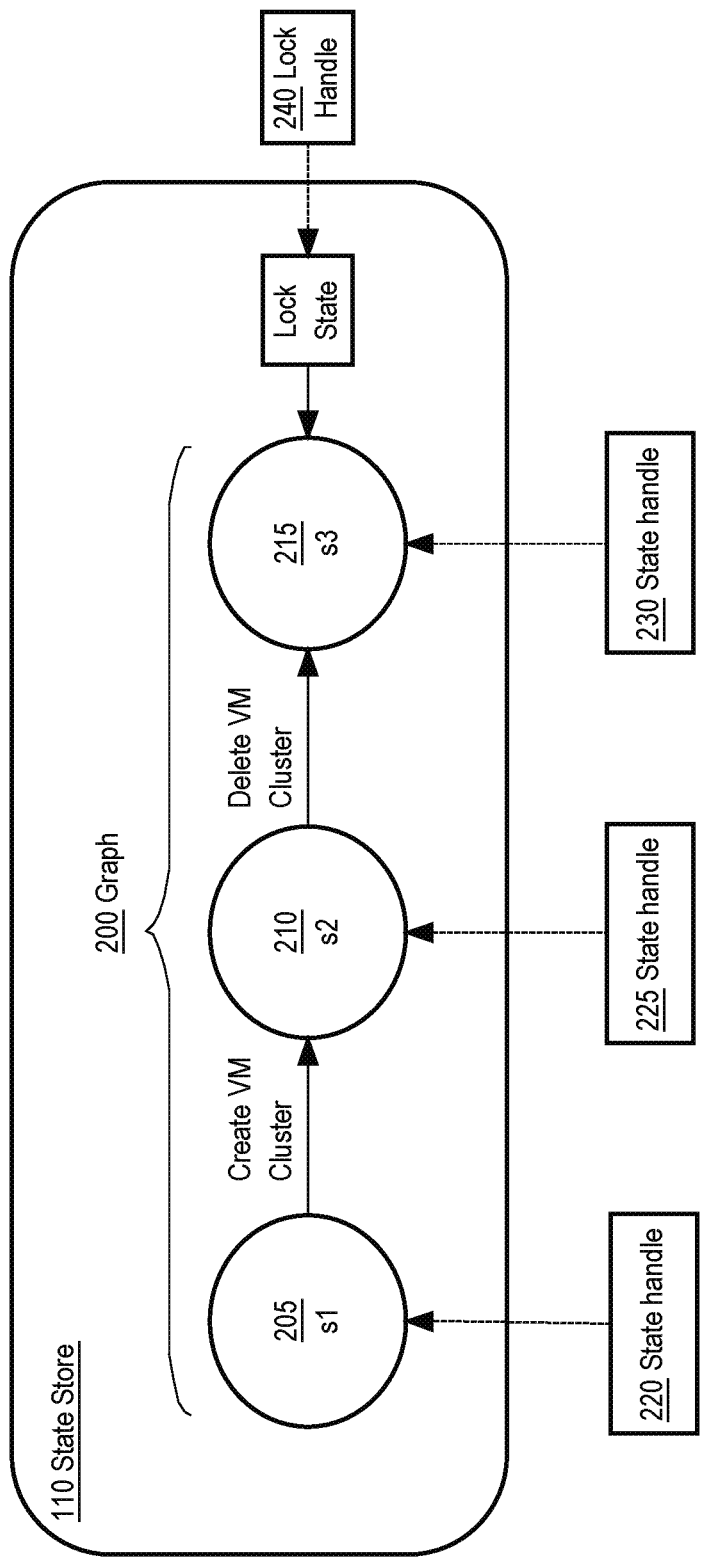
FIG. 2 depicts an example embodiment of a graph that stores snapshots of state information for a plurality of resource entities within a distributed cloud service, according to an embodiment.

FIG. 2 depicts an example embodiment of a graph that stores snapshots of state information for a plurality of resource entities within a distributed cloud service, according to an embodiment. State store 110 contains graph 200, which is a DAG that has nodes representing different snapshots of state information for the plurality of resource entities at given points in time. Node 205 represents state "s1" at a first point in time. Node 210 represents state "s2" at a second point in time, where the second point in time is after the first point in time. Node 215 represents state "s3" at a third point in time, where the third point in time is after both the first and second point in time. In an embodiment, the performance of a change operation, which changes the resource allocations of cloud resources 120, causes a new node to be added to graph 200. For example referring to FIG. 2, prior to any allocation changes taking place, graph 200 may only contain a single node, node 205, which contains the initial state information for cloud resources 120. If a change request is received to create a new VM cluster and the change is possible, the operations to create the new VM cluster would cause a new node to be added to graph 200. The new node, node 210, would represent a new snapshot of state information that includes the provisioning of the new VM cluster.

In an embodiment, the new node, node 210, is created prior to performance of the change operations that would create the new VM cluster. That is, node 210 represents a future desired state of cloud resources 120 that includes resource allocations for the new VM cluster. If the change operations to create the new VM cluster fails to complete, then the changes to allocations of cloud resources 120 are rolled back to the prior state (state s1). However, since graph 200 is a DAG implemented in state store 100, which is an object store, a new node, node 215, would be added to graph 200. Node 215 would represent state "s3" which is the current state of allocations for cloud resources 120 after the failed change operations for the new VM cluster are rolled back. Any changes to allocations of cloud resources 120 causes a new leaf node to be added to graph 200, regardless if the new state represents a rolled back state. Thus, state s1 (node 205) and state s3 (node 215) would contain the same state information for cloud resources 120.

Nodes in graph 200 are maintained in a serializable format. In an embodiment, the snapshot of state information is stored using a JavaScript Object Notation (JSON) format. Embodiments, are not limited to using the JSON format only. Other embodiments may be implemented using any available data serialization format. The following is an example snapshot of state information using a JSON format:

```
{
  "infrastructure":          /* availability domain */
  {
    "rows" : /* array of fabrics */
    {                "name" :       "122-A",    /*fabric name*/
                     "nodes" :
                     {
                       "name"       :           "124-A",    /* compute node*/
                       "type"       :           "HOST",
                       "resources"  :
                       {
                         "cpu"     : 20,        /*number of cores*/
                         "memory"  : 256MB      /*memory in MB*/
                         "storage" : 10GB       /local storage size*/
                       }
                     }
    }
  }
}
```

The top level JSON object is the availability domain called "infrastructure". The infrastructure contains an array of fabrics. The first fabric has a name of "122-A". Within the 122-A fabric, are JSON objects for each node that is located in fabric 122-A. The above example depicts only one node, however, multiple nodes may be located within a single fabric. The node object displayed has a name of "124-A" and a node type of "HOST" node. The resources for node 124-A are part of the nested JSON object entitled "resources". The resources object has properties that include "cpu", "memory", and "storage".

In an embodiment, the JSON file, represented by a particular node in graph 200, may be accessed by multiple different services to perform change operations. For example, if the change request is a request to generate a new VM on a node 124-A, and the placement service 114A has determined, based on a snapshot of state information, that VM 124-A has resources to provision the new VM, then hypervisor software running on node 124-A may access the JSON file representing the snapshot of state information in order to retrieve allocation information for provisioning the new VM.

State Handles and Lock Handles

In an embodiment, each node in graph 200 has a unique identifier called a state handle. Services involved with performing change operations, such as hypervisor applications, operating systems, and placement services 114A and 114B, use the state handle to access the correct node in graph 200. For example referring to FIG. 2, the operation to delete a VM cluster (moving from node 210 to node 215) may require a hypervisor application to access the snapshot of state information prior to deleting the VM cluster (node 210). The hypervisor application may use the state handle 225, which is associated with node 210, to access the snapshot of state information represented by node 210.

In order to ensure that there are no conflicts between multiple competing change requests, the state store management service 112 only allows a single placement service 114A to determine whether their change request can be fulfilled at one time. In an embodiment, the state store management service 112, in response to receiving a change request from placement service 114A, provides a lock handle to placement service 114A. The lock handle places the leaf node (node 215) in graph 200 into a lock state which restricts access to node 215 to only entities that were provided the lock handle. For instance, the placement service 114A receives the lock handle 240 and may have exclusive access to the state information in node 215 in order to determine whether the current allocation of cloud resources 120 is able to fulfill the change request. By granting exclusive access to placement service 114A, requests from other placement services will not interfere with placement service 114A's determination on how to fulfill its change request. Once placement service 114A determines that its change request is able to be fulfilled, placement service 114A may return the lock handle 240 back to the state store management service 112, which may then provide the lock handle to another placement service for their change request. That is, the placement service 114A does not keep the lock handle until the change request has been completed. Instead, the placement service 114A returns the lock handle once the placement service 114A has determined whether the change request can be fulfilled and how the new allocations of cloud resources 120 are to be adjusted to fulfill the change request. Performing action to implement the change request may occur after the lock handle has been returned.

State Store Management Service Interfaces

In an embodiment, the state store management service 112 provides a set of interfaces for: requesting lock handles on snapshots of state information; returning lock handles and with a new snapshot of state information; returning lock handles without changing state information; and retrieving snapshots of state information for services performing the change requests, such as placement services 114A and 114B and any other applications or services used to perform change operations. The following is a sample set of interfaces provided by the state store management service 112:

| Interface | Input Arguments | Output Arguments |
| --- | --- | --- |
| state_lock | Timeout (milliseconds) | return status (TRUE/FALSE) state handle lock handle |
| state_insert_unlock | state handle lock handle new state object data | return status (TRUE/FALSE) new state handle |
| state_unlock | state handle lock handle | return status (TRUE/FALSE) |
| state_query | state handle | return status (TRUE/FALSE) state object data |

In an embodiment, the "state_lock" interface is used when placement service 114A requests to obtain a lock handle for fulfilling a change request. The input for the state_lock interface is a timeout value. The timeout value represents a duration of time in which the placement service 114A needs to complete its determination on how to fulfill its change request and return the lock handle 240. If the placement service 114A exceeds the timeout value, the state store management service 112 may revoke the lock handle and may provide the lock handle to another service requesting to make changes. The timeout value ensures that no one placement service becomes a bottleneck for subsequent change requests. In one example, a background process may be implemented to monitor timeout values and if a timeout value is exceeded, the background service may release the lock.

The output for the state_lock interface includes a return status, a state handle, and a lock handle. The return status may be a boolean value where, if the value is TRUE, then the requestor receives the lock handle and the corresponding state handle. If, however, the boolean value is false, then that means the requestor is denied the lock handle. This may occur if another requestor currently has the lock handle. For instance, if placement service 114A possesses the lock handle and placement service 114B subsequently requests the lock handle, using the state_lock interface, the state store management service 112 may deny the request from the placement service 114B by making the return_status for the state_lock request false. The state_handle output represents the unique identifier for the leaf node in graph 200. The lock_handle output represents the lock handle provided by the state store management service 112.

In an embodiment, the "state_insert_unlock" interface is used by placement service 114A to return the lock handle and provide new state object data that reflects a snapshot of the future desired state of cloud resources 120 once the change request has been completed. Input for the state insert unlock interface includes the state handle, the lock handle, and the new state object data. The state handle and lock handle should match the ones previously provided as output from the state_lock interface by the state store management service 112. For example referring to FIG. 2, if the placement service 114A previously received state handle 230 and lock handle 240 for node 215 to fulfill a change request, then the input for the state_insert_unlock interface should include the corresponding state handle 230 and the lock handle 240. The new state object data input is used by the state store management service 112 to create a new snapshot of state information which will become a new leaf node in graph 200. The output for the state_insert_unlock interface is a return status and a new state handle. The return status may be a boolean value where a TRUE value corresponds to successfully returning and releasing the lock handle and creating a new snapshot and a FALSE value corresponds to unsuccessfully returning the lock handle. The new state handle output refers to a new leaf node in graph 200 and may be used by one or more other services to fulfill the change request. For instance, the placement service 114A may provide the new state handle to other services such as a hypervisor application for creating a new VM.

In an embodiment, the "state_unlock" interface is used by placement service 114A to return the lock handle to the state store management service 112 when no changes to allocations of cloud resources 120 take place. This may occur if the placement service 114A determines that the change request cannot be fulfilled. The input for the state_unlock interface includes the state handle and the lock handle. The output for the state_unlock interface is a return status. The return status may be a boolean value where a TRUE value corresponds to successfully returning and releasing the lock handle and a FALSE value corresponds to unsuccessfully returning the lock handle.

In an embodiment, the "state_query" interface is used by placement services 114A/114B and other services to retrieve the snapshot of state information. The input for the state_query interface is the state_handle. Output for the state_query interface includes a return status and the snapshot of state information corresponding to the provided state handle. For example referring to FIG. 2, if the input for the state_query interface is state handle 220, then the output would include node 205 (representing state s1). The state_query interface may be invoked by other services such as a hypervisor application that needs to know allocation information for cloud resources 120. The placement service 114A may provide the state handle to the hypervisor application, which may then retrieve the state information from the state store 110, via the state store management service 112. By passing only the state handle to other services, system 100 reduces the amount of network traffic by avoiding the need to pass the entire snapshot of state information from placement service 114A to any other services that needs to refer to the allocations of cloud resources 120.

Modifying Resource Allocations

Change requests to allocations of cloud resources 120 in system 100 are managed by the state store management service 112 and allocations of cloud resources 120 are stored in the state store 110. FIG. 3 is a flow diagram that depicts a process 300 for receiving a request to modify resources and modifying resource allocations within a distributed cloud service, according to an embodiment. The steps of the process as shown in FIG. 3 may be implemented using processor-executable instructions that are stored in computer memory. For the purposes of providing a clear example, the steps of FIG. 3 are described as being performed by processes executing in system 100. For the purposes of clarity, the process described may be performed with more or fewer steps than described in FIG. 3.

At step 302, process 300 maintains a first snapshot of state information for a plurality of resource entities within a distributed cloud service. In an embodiment, the state store management service 112 maintains snapshots of state information, including the first snapshot, in the state store 110. FIG. 4A depicts an example embodiment of a state store storing snapshots of state information for a plurality of resource entities within a distributed cloud service, according to an embodiment. Within FIG. 4A, state store 110 contains node 410, which represents the first snapshot of state information for cloud resources 120. The state store management service 112 maintains how requestors access snapshots of state information by controlling when the requestor obtains a lock handle and state handles for the snapshots stored in the state store 110.

At step 304, process 300 receives a request to modify resources allocated to one or more resource entities. In an embodiment, the placement service 114A may receive a request to modify resources allocated to resource entities from a client. For example, a client may wish to create a new VM within system 100. The placement service 114A may receive the request for a new VM (allocated with 10 CPUs) and may make a request to the state store management service 112 for a lock on the latest state information stored in the state store 110. For instance, the placement service 114A may invoke a method implementing the "state_lock" interface in order to receive lock handle 405 on node 410 and the corresponding state handle 412 for node 410.

At step 306, process 300 obtains a subtree lock on the state information for the plurality of resources reflected in the first snapshot. In an embodiment, the placement service 114A receives the lock handle 405 for node 410. By obtaining the lock handle, the placement service 114A has exclusive access to the latest snapshot of state information reflected in node 410. As described, the entity with the lock handle is the only entity that is allowed to make changes to current allocations of resource entities reflected in the snapshot of state information. Referring to FIG. 4, the placement service 114A receives lock handle 405 and corresponding state handle 412 for node 410.

At step 308, process 300 determines, based on the first snapshot of state information for the plurality of resource entities, that there are available resources to perform the request to modify resources. In an embodiment, the placement service 114A determines whether there are available resources, in cloud resource 120, to perform the request to modify resources by retrieving the snapshot of state information represented by node 410. The placement service 114A may invoke a method implementing the "state_query" interface, using the state handle 412 as input, in order to receive a copy of the snapshot of state information represented by node 410.

Displayed in FIG. 4A, cloud resources 120 contains fabric 122-A which contains host nodes 124-A and 124-B. Based on the snapshot of state information in node 410, host node 124-A has 20 CPUs total and is currently hosting VM 440 (10 CPUs allocated) and VM 445 (10 CPUs allocated). Host node 124-B has 25 CPUs total and is currently hosting VM 450 (10 CPUs). Using the above example where the request to modify resources is a request to create a new VM with 10 CPUs, the placement service 114A may determine, from the snapshot of state information in node 410, that the new VM (VM 455) should be created on node 124-B. This determination may be based on the number of available resources on host node 124-B. For example, the request to create VM 455 requires 10 CPUs to be allocated. The placement service 114A may determine that host node 124-B, which has 15 CPUs available, should host VM 455.

At step 310, process 300 generates and stores a second snapshot of the state information for the plurality of resource entities. In an embodiment, the placement service 114A generates a new snapshot of state information that reflects the new allocation of resources for host node 124-B to host VM 455. The placement service 114A may invoke a method implementing the "state_insert_unlock" interface in order to return the lock handle and to provide the new snapshot of state information to the state store management service 112. The input for the state_insert_unlock interface would be the state handle 412, lock handle 405, and a copy of the new snapshot of state information that reflects the new allocation of resources from host node 124-B to host VM 455. The state store management service 112 may release the lock on node 410 and create and store a new leaf node, node 415, in the state store 110. The state store management service 112 also provides a new state handle (state handle 417) to the placement service 114A, where the state handle 417 is an identifier corresponding to new snapshot of state information reflected in node 415.

At this point in time, node 415 represents the future desired state of state information for cloud resources 120, which includes 10 of the 25 total CPUs on host node 124-B to be allocated to VM 455 and 10 of the 25 total CPUs allocated to VM 450. Once the snapshot of state information reflected in node 415 is generated and stored in state store 110, node 415 becomes the most current reflection of resource allocations of cloud resources 120 even if VM 455 has yet to be created. The resources needed to create VM 455, including the 10 CPUs, have already been allocated and cannot be taken by other services.

At step 312, process 300 modifies the resources allocated to the one or more resource entities specified in the request. In an embodiment, modification of resources allocated to cloud resources 120 may be performed by one or more processes/applications running on one or more nodes in cloud resources 120, such as hypervisor software running on host node 124-B. The placement service 114A may provide the state handle 417 to the hypervisor software running on host node 124-B. The hypervisor software may then invoke a method implementing the "state_query" interface in order to retrieve the snapshot of state information corresponding to the state handle 417. Upon receiving a copy of node 415, the hypervisor software may modify resources on host node 124-B in order to provision 10 CPUs for the new VM, VM 455.

Receiving Subsequent Change Requests to Modify Resource Allocations

FIG. 4B depicts another example embodiment of a state store storing snapshots of state information for a plurality of resource entities within a distributed cloud service, according to an embodiment. Referring to FIG. 3, after step 310 but prior to step 312, if a subsequent change request is received, the state store management service 112 may issue lock handle 405 on the most current snapshot, node 415, even though VM 455 may not yet exist on host node 124-B. For example, if placement service 114B receives a new request to add an additional 5 CPUs to VM 450 (10 CPUs→15 CPUs), the placement service 114B may invoke a method implementing the "state_lock" interface in order to receive lock handle 405 on node 415 and the corresponding state handle 417 for node 415. The placement service 114B may then use the state handle 417 to retrieve the snapshot of state information reflected in node 415 to determine that host node 124-B is able to fulfill the request to add an additional 5 CPUs to VM 450. The placement service 114B may then generate a new snapshot of state information that reflects the new allocation of resources for VM 450 (15 CPUs) and send the new snapshot to the state store management service 112, along with the lock handle 405. The state store management service 112 may then release the lock on node 415 and store a new leaf node, node 420, in the state store 110. The snapshot reflected in node 420 for host node 124-B may indicate that VM 450 has 15 CPUs allocated and VM 455 has 10 CPUs allocated. Any subsequent change requests and lock requests initiated by placement services 114A/114B would receive the latest snapshot of state information (node 420) even if creation of VM 455 and the increase of 5 CPUs to VM 450 has yet to be performed.

If however, after step 310 but prior to step 315, the next change request received is a request to increase the number of CPUs for VM 450 from 10 CPUs to 20 CPUs, the placement service 114B may invoke a method implementing the "state_lock" interface in order to receive lock handle 405 on node 415. After examining the snapshot of state information reflected in node 415, the placement service 114B may determine that the CPUs for VM 450 cannot be increased to 20 CPUs because host node 124-B has already provisioned 15 of the total 25 CPUs to VM 455. In this case, the placement service 114B may invoke a method implementing the "state unlock" interface in order to return the lock handle 405 without updating the snapshot of state information for cloud resources 120.

Figure 4C:
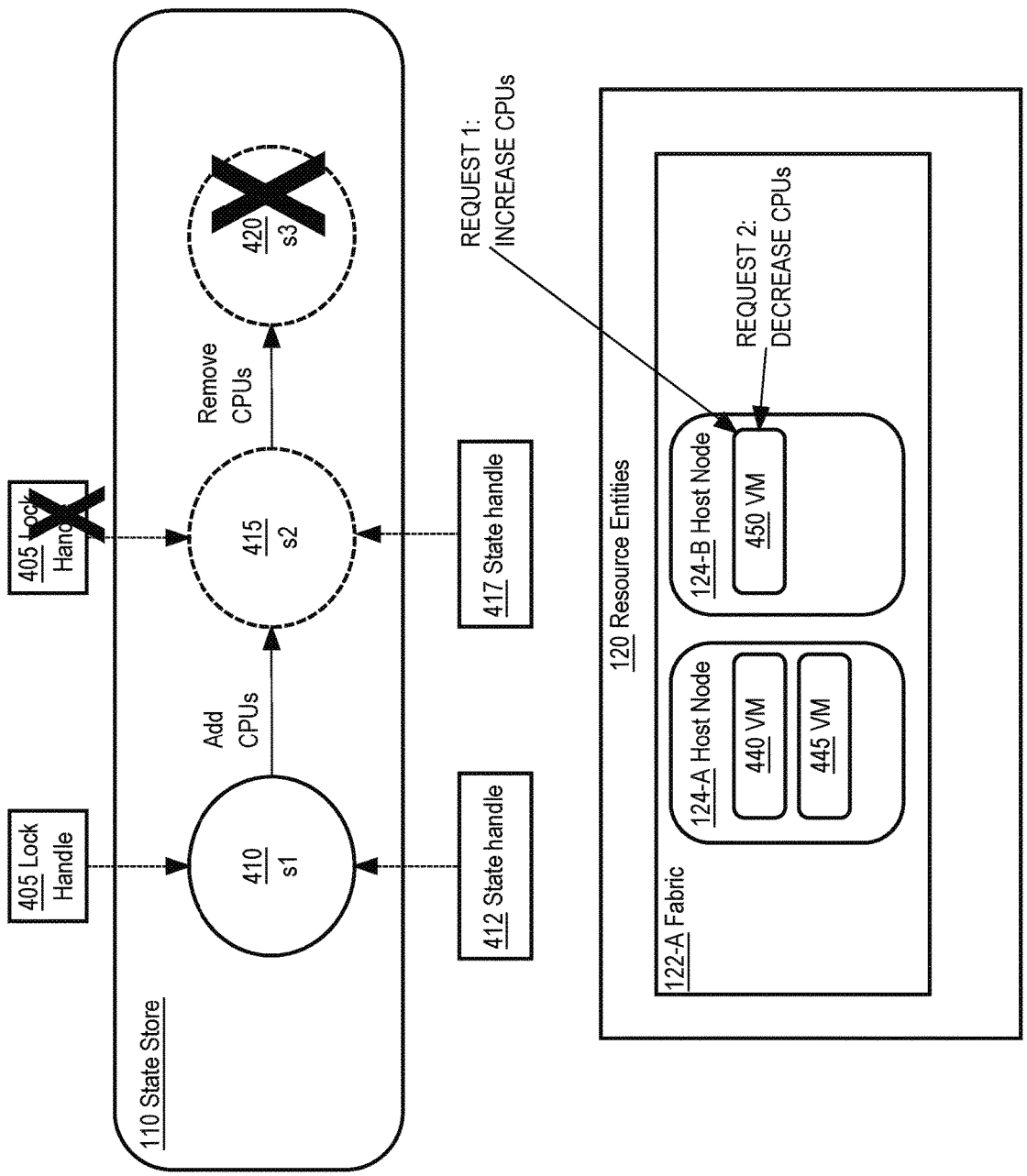

In an embodiment, the state store management service 112 may delay a subsequent change request if the subsequent change request conflicts with a current change request that may have not yet been performed. FIG. 4C depicts another example embodiment of a state store storing snapshots of state information for a plurality of resource entities within a distributed cloud service, according to an embodiment. Host node 124-B has a total of 20 CPUs and VM 450 currently has 10 CPUs allocated. The placement service 114A may provide a first change request to increase the number of CPUs for VM 450 from 10 to 20 CPUs. The placement service 114A may receive the lock handle 405 and the state handle 412 for node 410 in order to determine whether the number of CPUs for VM 450 may be increased. The placement service 114A may use the state handle 412 to retrieve the snapshot of state information reflected in node 410. The placement service 114A may return the lock handle 405 along with updated state information that includes an allocation of 20 CPUs total for VM 450. This new allocation is reflected in node 415.

Upon storing the new node 415, the state store management service 112 may receive a subsequent second change request from placement service 114B to decrease the number of CPUs for VM 450 from 20 CPUs to 15 CPUs. The state store management service 112 may determine that the second change request from placement service 114B may conflict with change operations to fulfill the first change request. By allowing the second change request from placement service 114B to proceed without ensuring that there is no conflict may cause the second change request to be completed prior to the first change request. If the second change request (decreasing VM 450's CPU count by 5) completed prior to the first change request (increasing VM 450's CPU count by 10), VM 450 may end up in a situation where it only has 5 CPUs allotted (second change request performed when VM 450 only has 10 CPUs resulting in only 5 CPUs). For this reason, the state store management service 112 may delay processing subsequent change requests that conflict with a change request where the change operations for the first change request have yet to be completed. Conflicts between change requests are not limited to the examples described above. The state store management service 112 may deem a subsequent change request as conflicting if the subsequent change request affects the same resource that is the subject of a prior change request that has yet to be fulfilled.

Referring back to FIG. 4C, after the placement service 114A (first requestor) returns the lock handle 405, the state store management service 112 may provide a new state handle 417 to the placement service 114A in order to complete the change operations associated with the first change request. The placement service 114B (second requestor) may then ask for the lock handle on the leaf node (node 415). Upon receiving the lock handle 405 and retrieving a copy of the snapshot represented by node 415, the placement service 114B may determine that the number of CPUs for VM 450 may be decreased by 5 CPUs. Then the placement service 114B may attempt to return the lock handle 405. The state store management service 112 may receive, from the placement service 114B, a method implementing the "state_insert_unlock" interface in order for the placement service 114B to return the lock handle and to provide the new snapshot of state information (node 420). However, the state store management service 112 may determine that the changes proposed in node 420 conflict with the changes in node 415. The state store management service 112 may delay any attempt by the placement service 114B to provide the new snapshot of state information (node 420). For example, the state store management service 112 may return a status of FALSE for the method implementing the "state_insert_unlock" interface and deny storing the new snapshot of state information (node 420) in the state store 110. Once the change operations for the first request (adding 10 CPUs to VM 450) are complete, the state store management service 112 may then allow another attempt by the placement service 114B to return the lock handle 405 and to provide a new snapshot of state information (reflected in node 420).

Processing Change Requests With Multiple Change Operations

In an embodiment, change requests may contain multiple change operation requests. In some cases, not all change operations requested in a change request may be fulfilled. For example, a change request may include increasing the number of CPUs for a VM and increasing the amount of storage for the VM. The host node for the VM may not be able to increase the number of CPUs for the VM but storage associated with the VM may be increased. In this case, the placement service 114A may allow the part of the request that can be completed to complete while the other parts of the request that cannot be completed may fail.

FIG. 4D depicts another example embodiment of a state store storing snapshots of state information for a plurality of resource entities within a distributed cloud service, according to an embodiment. Host node 124-B has a total of 20 CPUs and VM 450 currently has 15 CPUs allocated. The placement service 114A may provide a change request that includes the following changes:
 a. increasing the number of CPUs for VM 450 by 10 CPUs (15 CPUs→25 CPUs) and
 b. increasing the amount of storage for VM 450 to 250 GB (stored on storage node 124-N).

The placement service 114A may receive the lock handle 405 and the state handle 412 for node 410 in order to determine whether all or part of the changes in the change request can be successfully performed. The placement service 114A may use the state handle 412 to retrieve the snapshot of state information reflected in node 410. The placement service may then determine that the number of CPUs for VM 450 cannot be increased from 15 CPUs to 25 CPUs but, the amount of storage for VM 450 can be increased to 250 GB on storage node 124-N. In this case, the placement service 114A may return the lock handle 405 along with updated state information that only includes the increase of the amount of storage allocated to VM 450 but not the increase in CPUs for VM 450. The snapshot reflected in node 415 reflects only the increase of the amount of storage allocated to VM 450.

Implementation Mechanisms—Software Overview

Figure 5:
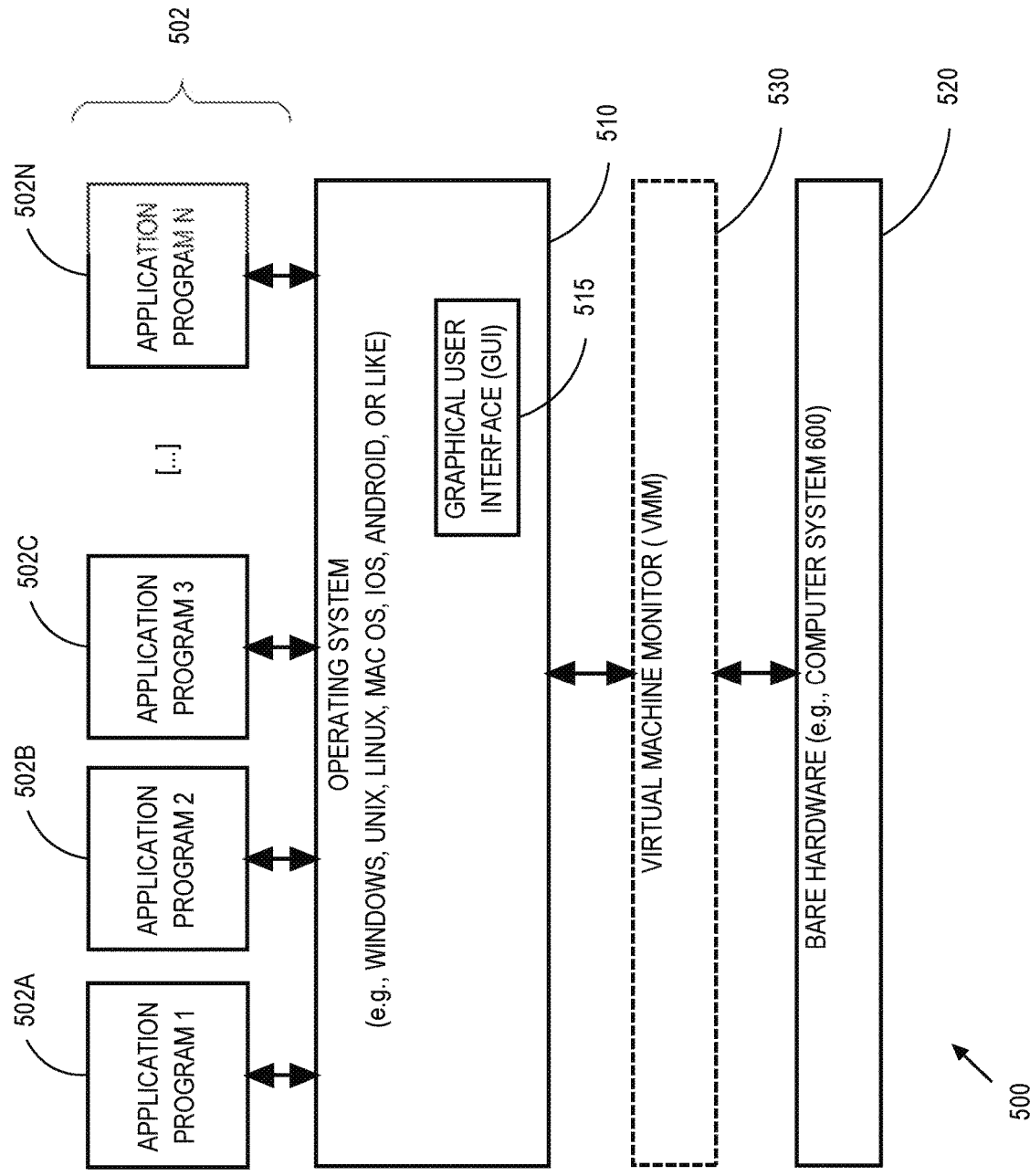
FIG. 5 is a block diagram depicting a software system upon which an embodiment of the invention may be implemented.
Figure 6:
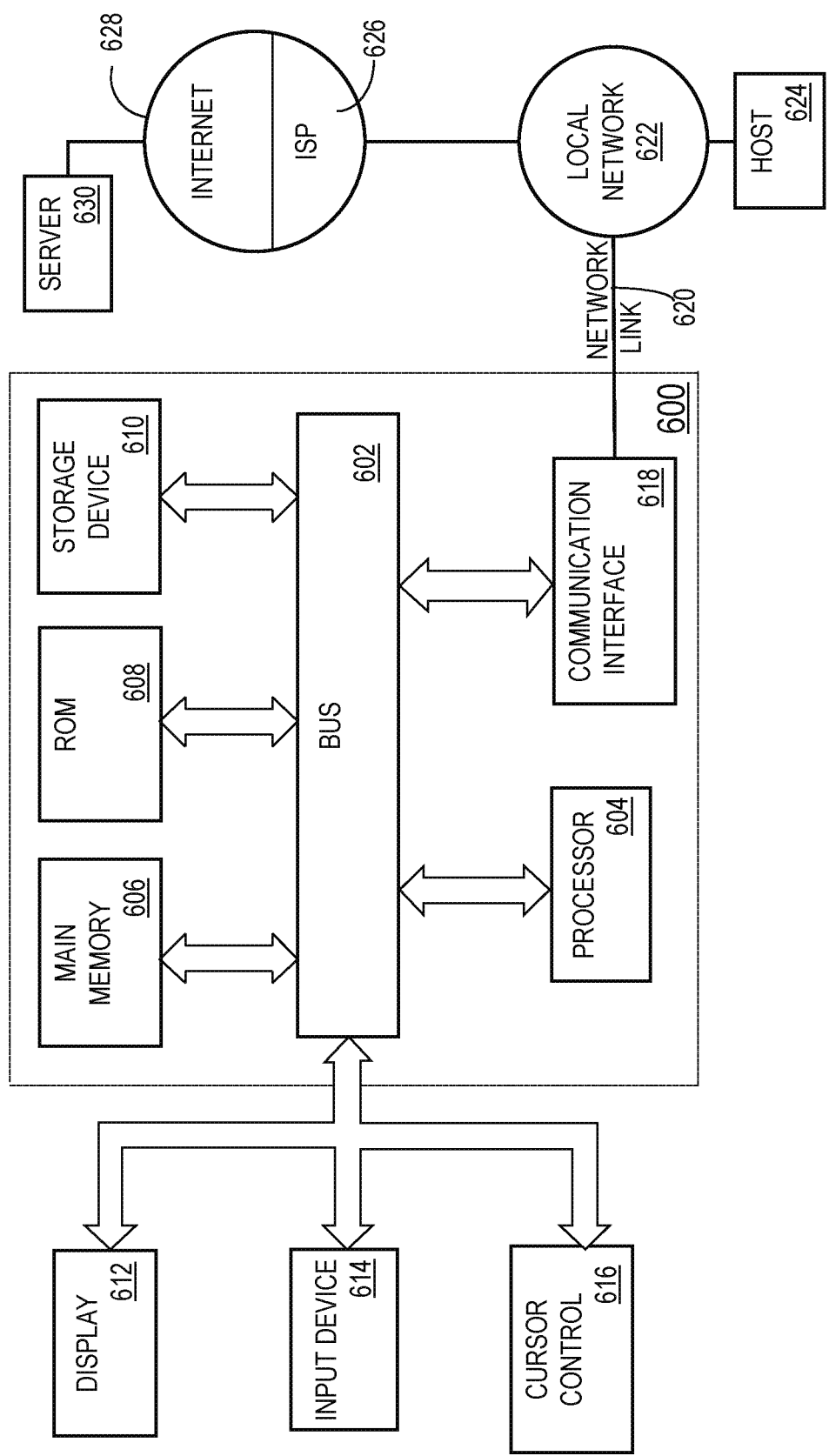
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 600 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 605) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   maintaining, at an endpoint in persistent storage, a first snapshot of state information for a plurality of resource entities within a distributed cloud service, wherein the first snapshot of the state information represents resources allocated to the plurality of resource entities;
   receiving a request specifying a modification of resources allocated to one or more resource entities;
   obtaining a virtual lock on the first snapshot;
   upon obtaining the virtual lock, determining, based on the first snapshot of the state information for the plurality of resource entities, that there are available resources to perform the specified modification;
   generating and storing, at the endpoint in the persistent storage, a second snapshot of the state information for the plurality of resource entities, wherein the second snapshot reflects an intended state of the plurality of resources based on the specified modification;
   releasing the virtual lock on the first snapshot; and
   performing the specified modification of resources allocated to the one or more resource entities to effect the intended state of the plurality of resources reflected by the second snapshot;
   wherein the method is performed by one or more computing devices.

2. The computer-implemented method of claim 1, further comprising:
   prior to performing the specified modification of resources allocated to the one or more resource entities, receiving a second request specifying a second modification of resources allocated to one or more other resource entities of the plurality of resource entities;
   obtaining the virtual lock on the second snapshot;
   upon obtaining the virtual lock, determining, based on the second snapshot of the state information for the plurality of resource entities, that there are available resources to perform the second modification of resources allocated to one or more other resource entities;
   generating and storing, at the endpoint in the persistent storage, a third snapshot of the state information for the plurality of resource entities, wherein the third snapshot reflects an intended state of the plurality of resources based on the second modification;
releasing the virtual lock on the second snapshot; and
performing the second modification of resources allocated to the one or more other resource entities to effect the intended state of the plurality of resources reflected by the third snapshot.

3. The computer-implemented method of claim 1, further comprising:
prior to performing the specified modification of resources allocated to the one or more resource entities, receiving a second request specifying a second modification of resources allocated to one or more other resource entities of the plurality of resource entities;
obtaining the virtual lock on the second snapshot;
upon obtaining the virtual lock, determining, based on the second snapshot of the state information for the plurality of resource entities, that there are not available resources to perform the second modification; and
releasing the virtual lock on the second snapshot.

4. The computer-implemented method of claim 1, wherein obtaining the virtual lock on the first snapshot comprises obtaining a state handle for the first snapshot, wherein the state handle is a unique identifier for the first snapshot of state information.

5. The computer-implemented method of claim 1, wherein the first snapshot of state information for the plurality of resource entities is stored within a leaf node within a directed acyclic graph; and
wherein nodes of the directed acyclic graph represent different snapshots of state information for the plurality of resource entities at different points in time.

6. The computer-implemented method of claim 5, wherein generating and storing, at the endpoint in the persistent storage, the second snapshot of the state information for the plurality of resource entities comprises:
generating the second snapshot of the state information for the plurality of resource entities; and
storing the second snapshot as a child node of a node corresponding to the first snapshot in the directed acyclic graph.

7. The computer-implemented method of claim 1, wherein the first snapshot of state information is formatted using JavaScript Object Notation (JSON) objects and the second snapshot of state information is formatted using JSON objects.

8. The computer-implemented method of claim 1, wherein the endpoint in persistent storage is an object store endpoint.

9. The computer-implemented method of claim 1, further comprising:
prior to performing the specified modification of resources allocated to the one or more resource entities, receiving a second request specifying a second modification of a first resource and a second resource allocated to one or more other resource entities of the plurality of resource entities;
obtaining the virtual lock on the second snapshot;
upon obtaining the virtual lock, determining, based on the second snapshot of the state information for the plurality of resource entities, that there are available resources to perform the second modification on the first resource but there are no available resources to perform the second modification on the second resource;

generating and storing, at the endpoint in the persistent storage, a third snapshot of the state information for the plurality of resource entities, wherein the third snapshot reflects an intended state of the plurality of resources based on the second modification of the first resource and no modification of the second resource;
releasing the virtual lock on the second snapshot; and
performing the second modification of the first resource allocated to the one or more other resource entities to effect the intended state of the plurality of resources based on the second modification of the first resource to effect the intended state of the plurality of resources reflected by the third snapshot.

10. The computer-implemented method of claim 1, further comprising:
prior to performing the specified modification of resources allocated to the one or more resource entities, receiving a second request specifying a second modification of resources allocated to the one or more resource entities of the plurality of resource entities;
obtaining the virtual lock on the second snapshot;
upon obtaining the virtual lock, determining, based on a second snapshot of the state information for the plurality of resource entities, that there are available resources to perform the second modification;
generating a third snapshot of the state information for the plurality of resource entities, wherein the third snapshot reflects an intended state of the plurality of resources based on the second modification;
determining that the second modification of resources reflected in the third snapshot conflicts with the specified modification of resources reflected in the second snapshot;
upon completion of the specified modification of the resources allocated to the one or more resource entities reflected in the second snapshot, storing the third snapshot at the endpoint in the persistent storage;
releasing the virtual lock on the second snapshot; and
performing the second modification of resources allocated to the one or more resource entities to effect the intended state of the plurality of resources reflected by the third snapshot.

11. A non-transitory computer-readable storage medium storing sequences of instructions that, when executed by one or more processors, cause:
maintaining, at an endpoint in persistent storage, a first snapshot of state information for a plurality of resource entities within a distributed cloud service, wherein the first snapshot of the state information represents resources allocated to the plurality of resource entities;
receiving a request specifying a modification of resources allocated to one or more resource entities;
obtaining a virtual lock on the first snapshot;
upon obtaining the virtual lock, determining, based on the first snapshot of the state information for the plurality of resource entities, that there are available resources to perform the specified modification;
generating and storing, at the endpoint in the persistent storage, a second snapshot of the state information for the plurality of resource entities, wherein the second snapshot reflects an intended state of the plurality of resources based on the specified modification;
releasing the virtual lock on the first snapshot; and
performing the specified modification of resources allocated to the one or more resource entities to effect the intended state of the plurality of resources reflected by the second snapshot.

12. The non-transitory computer-readable storage medium of claim 11, the sequences of instructions including instructions that, when executed by the one or more processors, cause:

prior to performing the specified modification of resources allocated to the one or more resource entities, receiving a second request specifying a second modification of resources allocated to one or more other resource entities of the plurality of resource entities;

obtaining the virtual lock on the second snapshot;

upon obtaining the virtual lock, determining, based on second snapshot of the state information for the plurality of resource entities, that there are available resources to perform the second modification of resources allocated to one or more other resource entities;

generating and storing, at the endpoint in the persistent storage, a third snapshot of the state information for the plurality of resource entities, wherein the third snapshot reflects an intended state of the plurality of resources based on the second modification;

releasing the virtual lock on the second snapshot; and performing the second modification of resources allocated to the one or more other resource entities to effect the intended state of the plurality of resources reflected by the third snapshot.

13. The non-transitory computer-readable storage medium of claim 11, the sequences of instructions including instructions that, when executed by the one or more processors, cause:

prior to performing the specified modification of resources allocated to the one or more resource entities, receiving a second request specifying a second modification of resources allocated to one or more other resource entities of the plurality of resource entities;

obtaining the virtual lock on the second snapshot;

upon obtaining the virtual lock, determining, based on second snapshot of the state information for the plurality of resource entities, that there are not available resources to perform the second modification; and releasing the virtual lock on the second snapshot.

14. The non-transitory computer-readable storage medium of claim 11, wherein obtaining the virtual lock on the first snapshot comprises obtaining a state handle for the first snapshot, wherein the state handle is a unique identifier for the first snapshot of state information.

15. The non-transitory computer-readable storage medium of claim 11, wherein the first snapshot of state information for the plurality of resource entities is stored within a leaf node within a directed acyclic graph; and wherein nodes of the directed acyclic graph represent different snapshots of state information for the plurality of resource entities at different points in time.

16. The non-transitory computer-readable storage medium of claim 15, wherein generating and storing, at the endpoint in the persistent storage, the second snapshot of the state information for the plurality of resource entities comprises:

generating the second snapshot of the state information for the plurality of resource entities; and storing the second snapshot as a child node of a node corresponding to the first snapshot in the directed acyclic graph.

17. The non-transitory computer-readable storage medium of claim 11, wherein the first snapshot of state information is formatted using JavaScript Object Notation (JSON) objects and the second snapshot of state information is formatted using JSON objects.

18. The non-transitory computer-readable storage medium of claim 11, wherein the endpoint in persistent storage is an object store endpoint.

19. The non-transitory computer-readable storage medium of claim 11, the sequences of instructions including instructions that, when executed by the one or more processors, cause:

prior to performing the specified modification of resources allocated to the one or more resource entities, receiving a second request specifying a second modification of a first resource and a second resource allocated to one or more other resource entities of the plurality of resource entities;

obtaining the virtual lock on the second snapshot;

upon obtaining the virtual lock, determining, based on second snapshot of the state information for the plurality of resource entities, that there are available resources to perform the second modification with respect to the first resource but there are no available resources to perform the second modification with respect to the second resource;

generating and storing, at the endpoint in the persistent storage, a third snapshot of the state information for the plurality of resource entities, wherein the third snapshot reflects an intended state of the plurality of resources based on the second modification of the first resource and no modification of the second resource;

releasing the virtual lock on the second snapshot; and performing the second modification of the first resource allocated to the one or more other resource entities to effect the intended state of the plurality of resources based on the second modification of the first resource to effect the intended state of the plurality of resources reflected by the third snapshot.

20. The non-transitory computer-readable storage medium of claim 11, the sequences of instructions including instructions that, when executed by the one or more processors, cause:

prior to performing the specified modification of resources allocated to the one or more resource entities, receiving a second request specifying a second modification of resources allocated to the one or more resource entities of the plurality of resource entities;

obtaining the virtual lock on the second snapshot;

upon obtaining the virtual lock, determining, based on second snapshot of the state information for the plurality of resource entities, that there are available resources to perform the second modification;

generating a third snapshot of the state information for the plurality of resource entities, wherein the third snapshot reflects an intended state of the plurality of resources based on the second modification;

determining that the second modification of resources reflected in the third snapshot conflicts with the specified modification of resources reflected in the second snapshot;

upon completion of the specified modification of the resources allocated to the one or more resource entities reflected in the second snapshot, storing the third snapshot at the endpoint in the persistent storage;

releasing the virtual lock on the second snapshot; and performing the second modification of resources allocated to the one or more resource entities to effect the intended state of the plurality of resources reflected by the third snapshot.

* * * * *